(12) United States Patent
Shaw et al.

(10) Patent No.: US 6,477,871 B1
(45) Date of Patent: Nov. 12, 2002

(54) LID RESTRAINT FOR PORTABLE COMPUTER

(75) Inventors: Jane Henderson Shaw, Renfrewshire (GB); Sohail Syyed, Glasgow (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/490,791

(22) Filed: Jan. 24, 2000

(30) Foreign Application Priority Data

Mar. 27, 1999 (GB) .............................................. 9906997

(51) Int. Cl.7 .......................... E05B 69/00; E05B 73/00
(52) U.S. Cl. ................................ 70/58; 70/19; 248/551
(58) Field of Search .............................. 70/18, 58, 164; 248/551–553; 361/732

(56) References Cited

U.S. PATENT DOCUMENTS

| | | | | |
|---|---|---|---|---|
| 3,906,758 A | * | 9/1975 | Hurwitt | 70/30 |
| 4,028,913 A | * | 6/1977 | Falk | 70/58 |
| 4,585,202 A | * | 4/1986 | Parsekian | 248/553 |
| 5,351,508 A | * | 10/1994 | Kelley | 70/58 |
| 5,447,045 A | | 9/1995 | Cheng | 70/58 |
| 5,595,074 A | | 1/1997 | Munro | 70/58 |
| 5,642,634 A | * | 7/1997 | Perry | 70/18 |
| 5,836,183 A | | 11/1998 | Derman | 70/58 |
| 6,182,481 B1 | * | 2/2001 | Nagy | 70/58 |
| 6,216,499 B1 | * | 4/2001 | Ronberg et al. | 70/58 |
| 6,308,928 B1 | * | 10/2001 | Galant | 248/553 |

* cited by examiner

*Primary Examiner*—Anthony Knight
*Assistant Examiner*—John B. Walsh
(74) *Attorney, Agent, or Firm*—J. Bruce Schelkopf

(57) ABSTRACT

An article for providing a visual deterrent against theft of a portable electronic device is provided. The portable electronic device such as a portable computer has a first portion, such as a keyboard and body part and a second portion such as a display hinged for rotation relative to the first portion. The article comprises a body arranged to prevent hinging of the second portion relative to the first portion and a lock for preventing removal of the body of the article from the portable electronic device.

2 Claims, 2 Drawing Sheets

LID RESTRAINT FOR PORTABLE COMPUTER

FIELD OF THE INVENTION

The present invention relates to portable computers and more specifically to devices for deterring theft of portable computers.

BACKGROUND OF THE INVENTION

As portable computers such as laptop and notebook computers have become more popular and more powerful, they have become increasingly attractive targets for theft, including in the workplace of the computer's user. Portable computers, such as the ThinkPad laptop from IBM Corporation, are designed to be easily portable and it is this characteristic which also makes them easy to steal (ThinkPad and IBM are trademarks of IBM Corporation). The main factors which make them so easy to steal is that they are relatively small and can be easily concealed in a briefcase, bag or simply carried under the arm. This results in office theft of a portable computer being much simpler than larger equipment such as personal computers.

As such thefts have become more common and more costly, an assortment of devices and systems have been proposed for securing portable computers from theft. Solutions such as password protection on BIOS, hard drive and operating system have been implemented. However, this does not provide a visual deterrent or increase the physical difficulty of stealing a mobile computer. A solution which does provide a visual deterrent is to fix machines to desks but this solution detracts from the advantages of having a portable computer.

U.S. Pat. No. 5,632,165 discloses a security anchor for a laptop computer which is adhesively attached to a surface of a laptop computer. A shaft at the end of a flexible security cable is inserted and locked inside the security anchor,, and cannot be removed until sliders within the security anchor are selectively arranged into a predetermined one of a combination of positions. A disadvantage of this device is that the bulk of the security anchor remains permanently attached to the computer, interfering with storage and positioning of the computer, and detracting from its external appearance.

An alternative security feature is found in certain laptop computers manufactured by International Business Machines Corporation, including the ThinkPad models 560, 760 and 770. An elongated slot in an exterior side surface of the base of the laptop computer accepts a suitably shaped locking pin attached to a security cable. The locking pin is inserted into the slot, rotated, and locked in place so as to prevent its removal from the laptop, thereby attaching the security cable to the computer. Because the components of portable computers are extremely small, the locking pin and security lock are necessarily small as well, and therefore provide only limited protection against theft.

German published patent application number DE 297 20 285 U1, discloses a theft prevention device, having a block attached to a thin carrier which is inserted in the gap between the keyboard and the screen of a laptop computer. The device has a hole for a padlock, securing the carrier to a security chain or steel cable. The carrier is a thin rectangular element, and the block is a rectangular solid extending upwardly from the carrier to prevent the carrier from being pulled from the rear of the computer through the gap between the keyboard and screen. This device can be used only in conjunction with a security chain or steel cable which is permanently affixed to the workplace.

Pending PCT patent application US98/15263 discloses a locking plate which secures a portable computer when open or closed, through a gap between the base and hinged cover and between two risers which extend upwardly from the base. The locking plate includes a thin flat rectangular stem pierced by a hole toward the distal end, and two thin flat flanges coplanar with the stem and extending in opposite directions perpendicularly to the stem. In use the locking plate lies flat on the tops of the key caps of the keyboard. A security cable is attached to the locking plate by a padlock, preventing the locking plate from being withdrawn back through the gap and thereby anchoring the computer. The thickness of the locking plate is sized to fit between the base and cover of the computer when the cover is closed. Alternative locking plates having different combinations of flanges and stems are disclosed, including: one stem and one flange; two stems and one flange; and two stems and three flanges. This device also requires a security chain or steel cable permanently affixed to the workplace.

There is thus a need for a security device as a visual deterrent to reduce the chances of theft of a portable computer without the need for a chain or cable permanently fixed to the workplace. Since portable computers are, by definition, portable, they are frequently used in locations where such a permanently affixed cable or chain is not available.

SUMMARY OF THE INVENTION

Accordingly, the present invention provides an article for providing a visual deterrent against theft of a portable electronic device, the device having a first portion and a second portion hinged for rotation relative to the first portion, the article having an open and a closed position, the first portion being substantially in planar contact with the second portion in the closed position and the first portion being in contact with the second portion along substantially one edge only in the open position, the article comprising: a body arranged to prevent hinging of the second portion relative to the first portion from an open position to a closed position; and a lock for preventing removal of the body of the article from the portable electronic device.

The present invention acts as a visual deterrent. Although this may not prevent theft of the computer, it helps to reduce the likelihood of theft. The present invention increases the difficulty of concealing and stealing a portable computer. The locking bar can be seen and is a visual deterrent, unlike passwords etc., which only become visible after theft of the machine when a thief tries to use the machine.

In a first embodiment, the body of the article comprises two portions, which, in use, are joined so as to surround the second portion of the portable electronic device. Such an embodiment may be easily used with an unmodified conventional portable computer.

In a preferred embodiment, the lock is a combination lock.

In a second embodiment, the portable electronic device further comprises a lock for retaining the body of the article and the body of the article is shaped and located so as to prevent hinging of the second portion relative to the first portion. Such an embodiment is more convenient for use by a user, but requires an adapted portable computer.

BRIEF DESCRIPTION OF THE DRAWINGS

Embodiments of the invention will now be described, by way of example, with reference to the accompanying drawings, in which.

DETAILED DESCRIPTION OF THE INVENTION

Figure 1:
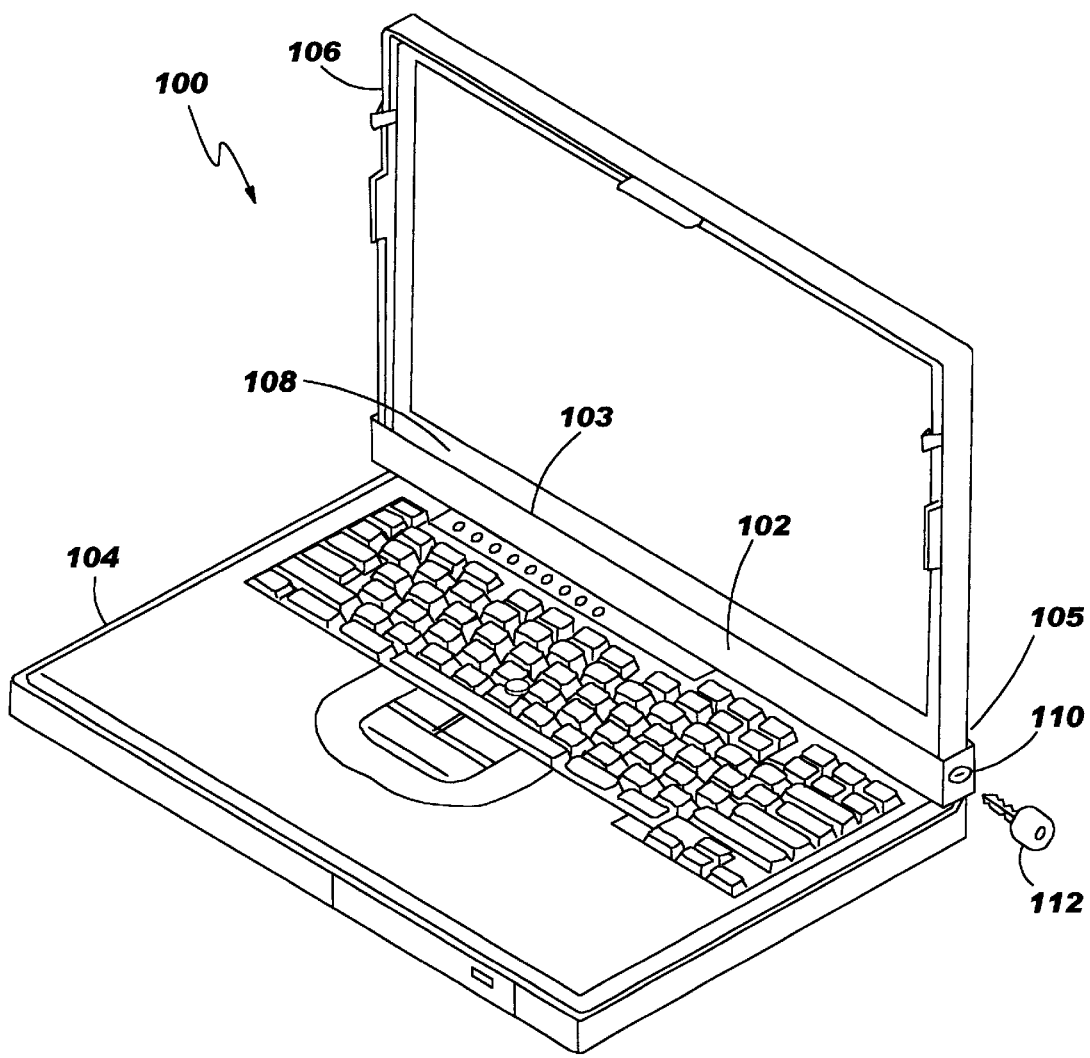
FIG. 1 is a perspective view of a lockable bar according to a first embodiment of the present invention positioned for insertion between the cover and base of a portable computer.

As shown in FIG. 1, the locking bar 102 of this invention secures a conventional portable electronic device such as a laptop or notebook computer 100 around the cover 106 of the computer. The base 104 and the cover 106 are rotatably connected by a hinge 108. The locking bar 102 fits adjacent to the hinge 108 of the cover 106, and the base 104. The locking bar 102 prevents operation of the hinge 108 and consequently prevents closure of the cover 106. A first part 103 of the locking bar 102 is placed around the cover 106 of the portable computer 100. A second part 105 of the locking bar 102 of FIG. 1 is placed around the cover 106 of the portable computer 100. The two parts are then joined together and locked with lock 110 so that they cannot be separated. Thus the cover is prevented from being closed. Such a deterrent against theft may be implemented on a conventional portable computer 100 without the need for any modification to the portable computer 100 and may be added by a user to a portable computer 100 which has already been purchased. In a variation of this embodiment, the two parts of the locking bar 102 are joined permanently with a hinge, placed around the cover 106 of the portable computer 100 and locked with lock 110.

As an alternative to the lock 110 shown in FIG. 1 as being integral with the locking bar, a lock, such as a padlock, may be used which joins together the two parts of the locking bar by passing through holes or eyes in the locking bar so as to prevent the two parts of the locking bar being separated. The lock used may be operated with a key 112 or it may be operated by the use of a combination.

Figure 2:
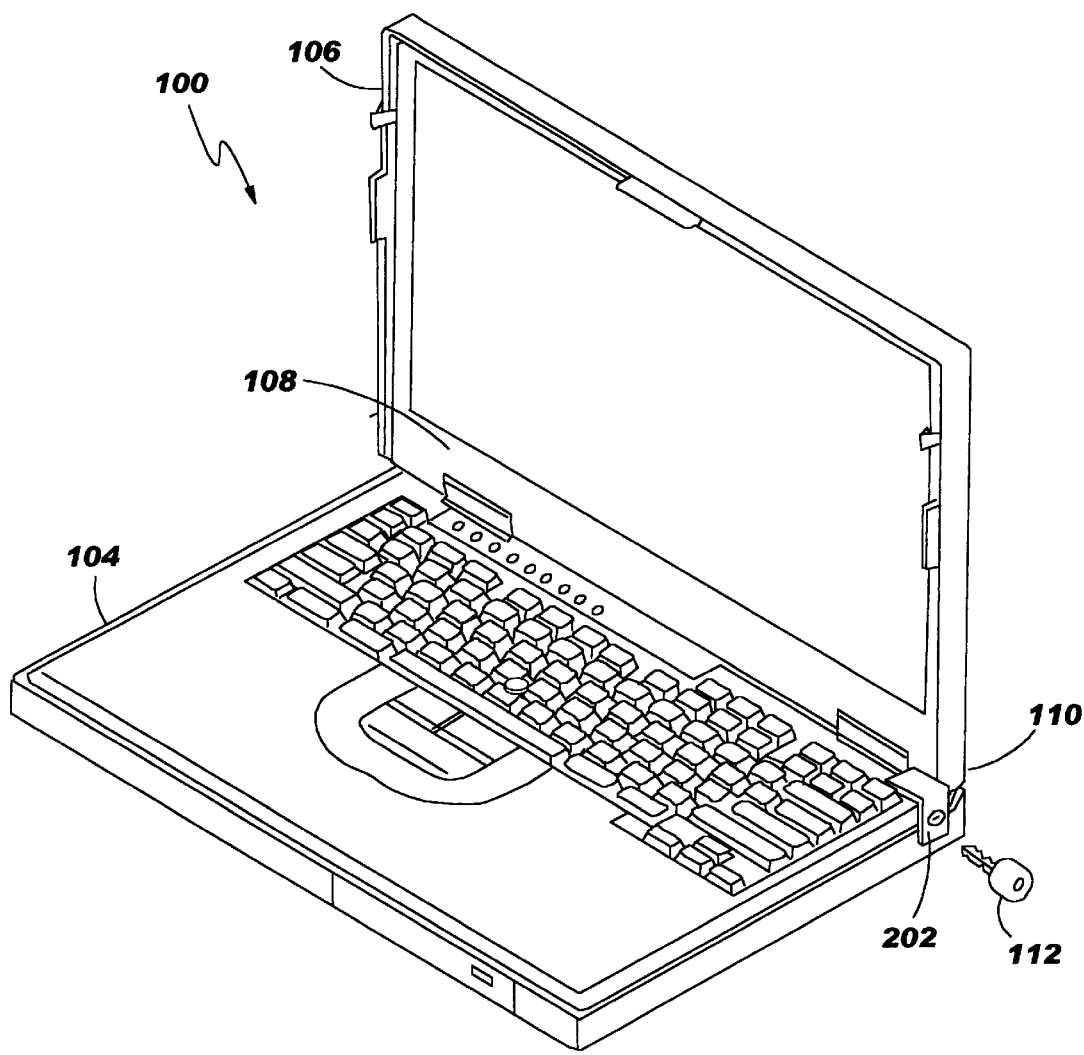
FIG. 2 is a perspective view of a lockable bar according to a second embodiment of the present invention positioned for insertion between the cover and base of a portable computer.

FIG. 2 shows an alternative embodiment of the invention, in which a lock 110 is incorporated into the portable computer 100. This embodiment is suitable for inclusion in portable computers 100 at the time of manufacture. The locking bar 202 is fitted into the side of the portable computer 100 and is then locked in place. In this embodiment, the lockable bar 202 does not need to fit round the portable computer 100. The locking bar 202 only needs to be large enough to prevent the cover 106 from closing.

The locking bars of the present invention do not permanently attach to any part of the portable computer and thereby preserve the computer's appearance and ability to be stored compactly.

What is claimed is:

1. An article for providing a visual deterrent against theft of a portable computer, the computer having a base portion and a cover portion hinged for rotation relative to the base portion, the computer having an open and a closed position, the base portion being substantially in planar contact with the cover portion in the closed position and the base portion being in contact with the cover portion along substantially one edge only in the open position, the article comprising:

a body comprising two portions, said body arranged to surround the cover portion when the computer is in the open position, said body being positioned near the edge so as to prevent hinging of the cover portion relative to the base portion from an open position to a closed position; and a lock for preventing separation of the two portions of the body of the article wherein said lock prevents removal of said article from the portable computer to provide visual deterrence against theft.

2. An article as claimed in claim 1, wherein the lock is a combination lock.

* * * * *